Feb. 8, 1944.　　G. B. DAVIS, JR　　2,341,268
FUEL TANK NEUTRALIZER
Filed April 8, 1941　　3 Sheets-Sheet 1
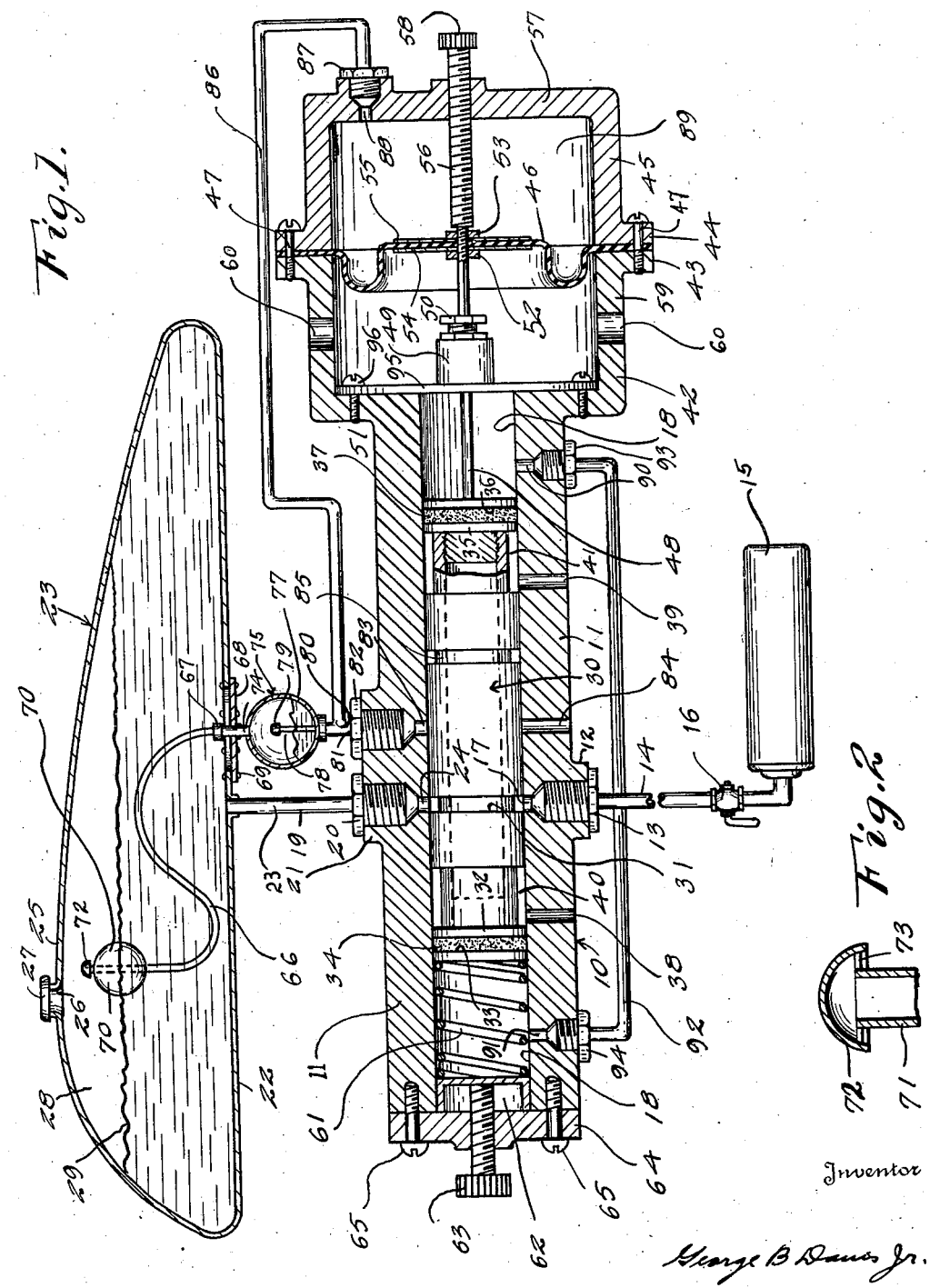
Inventor
George B Davis Jr.
By Kimmel & Crowell Attys

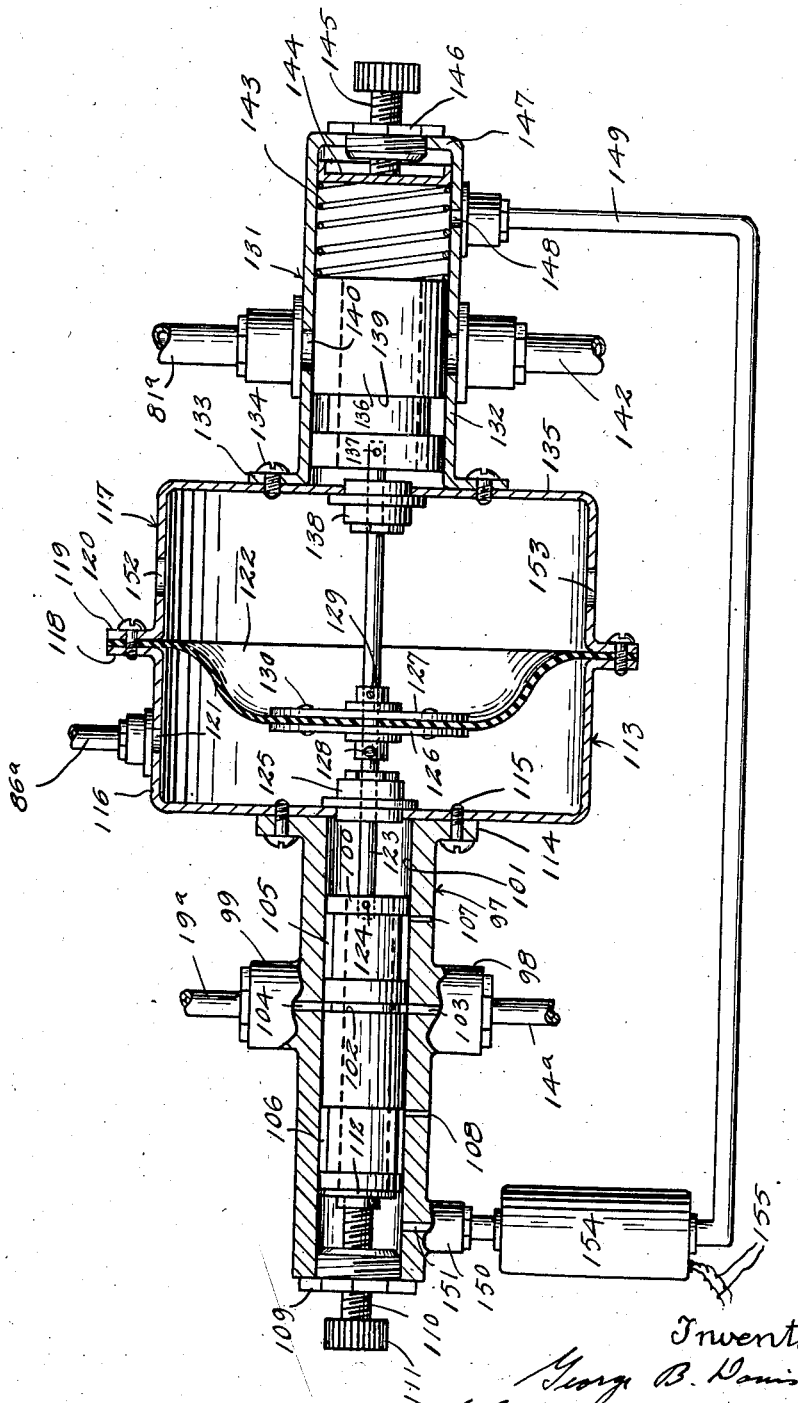

Feb. 8, 1944.  G. B. DAVIS, JR  2,341,268
FUEL TANK NEUTRALIZER
Filed April 8, 1941  3 Sheets-Sheet 3
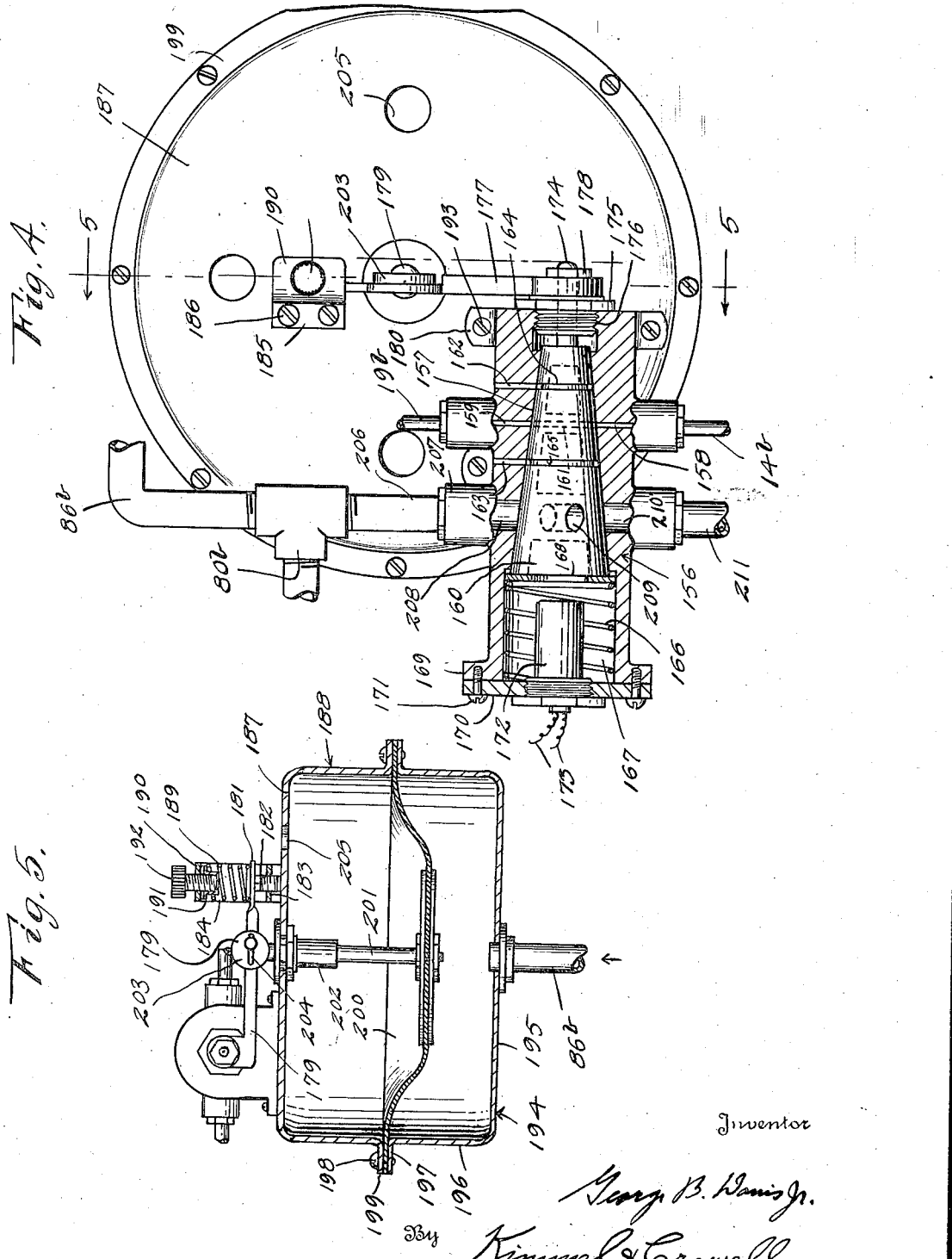

Patented Feb. 8, 1944

2,341,268

UNITED STATES PATENT OFFICE 2,341,268

FUEL TANK NEUTRALIZER

George B. Davis, Jr., Washington, D. C.

Application April 8, 1941, Serial No. 387,486

7 Claims. (Cl. 220—88)

This invention relates to gasoline or combustible fuel tanks and to a means for preventing the accumulation of a combustible gas above the liquid fuel as the fuel is drained from the tank.

An object of this invention is to provide in combination with a liquid fuel tank a carbon dioxide tank and means controlled from atmospheric pressure for maintaining a predetermined amount of gas pressure in the fuel tank.

Another object of this invention is to provide a combination of this kind including means for maintaining a predetermined carbon dioxide pressure in the fuel tank irrespective of any atmospheric pressure or temperatures.

A further object of this invention is to provide in a device of this kind an automatically operable pressure equalizing means.

A further object of this invention is to provide in a device of this kind a buoyant carrier for the carbon dioxide exhaust so that the device may be readily adapted for aeroplanes and operable at any inclination or elevation of the tank.

A further object of this invention is to provide a device of this kind which is so constructed as to take care of the replacement of the fuel for the entire tank, and which includes means whereby if the tank should be punctured to release the gas pressure the system may be manually cut off.

To the foregoing objects and to others which may hereinafter appear, the invention consists of the novel construction, combination and arrangement of parts as will be more specifically referred to and illustrated in the accompanying drawings wherein are shown embodiments of the invention, but it is to be understood that changes, variations and modifications may be resorted to which fall within the scope of the invention as claimed.

In the drawings:

Figure 1 is a vertical section partly broken away and in detail of a carbon dioxide system connected with a liquid fuel tank, Figure 2 is a fragmentary vertical section of the outlet cap mounted on a buoyant body within the fuel tank, Figure 3 is a longitudinal section partly in detail of a modified form of gas regulating valve structure, Figure 4 is a top plan partly broken away and in section of another modification of regulating valve means, and Figure 5 is a sectional view taken on the line 5—5 of Figure 4.

It is well known that a combustible fuel used in internal combustion engines is highly volatile and as the fuel is drawn from the supply tank air replaces the fuel taken from the tank and this air in the tank is highly charged with the combustible mixture, so that if a spark comes in contact with the combustible mixture in the fuel tank, the tank is liable to explode or the fuel catch on fire. Heretofore attempts have been made to replace the fuel in the tank which is drained out by discharging carbon dioxide gas into the tank to thereby neutralize vapors rising from the gas. However, the difficulties of devices at present available are that where a device of this kind is mounted on an aeroplane the carbon dioxide gas is exhausted before the tank is completely drained or the carbon dioxide gas is manually controlled and under combat conditions the aviator is not able to turn on the carbon dioxide gas system so that the gasoline tank or tanks in an aeroplane have contained therein a highly combustible mixture of vaporized fuel which will ignite from either static electricity or incendiary bullet.

In order to thereby provide a means whereby the fuel tank may be initially communicated with a carbon dioxide tank so that the fuel drained from the fuel tank will be constantly replaced by carbon dioxide gas and in order to provide a means whereby in the event the fuel tank should be punctured so as to thereby release the carbon dioxide gas pressure in the fuel tank, I have provided a pressure operated valve structure generally designated as 10. The valve structure 10 includes a cylindrical body 11, which has a boss 12 intermediate the ends thereof in which a coupling member 13 is mounted. The coupling member 13 is connected with a pipe 14 leading from a carbon dioxide tank 15. A manually operable and pressure reducing valve structure 16 is interposed in the pipe 14, so that the desired gas pressure may be communicated with the cylindrical body 11. The body 11 is provided with an intake port 17 leading into the cylinder 18 which is formed in the body 11.

A pipe 19 is connected by means of a connector 20 to a boss 21, which is disposed diametrically opposite the boss 12 and the pipe 19 is connected at the opposite end thereof to the bottom wall 22 of a fuel tank generally designated as 23. The body 11 is provided with an outlet port 24 disposed diametrically opposite the intake port 17 and the coupling member 20 together with the pipe 19 communicates with the outlet port 24.

The tank 23 is of conventional construction and in the present instance is shown having a configuration such that it may be incorporated in one of the wing structures of an aeroplane. The top wall 25 of the tank 23 has secured thereto a filler neck 26 on which a filler cap 27 is mounted. The cap 23 when in applied position is adapted to seal the top of the tank 23 so as to prevent the admission of any air or the exhaust of any gas which may be discharged in the space 28, which is above the level 29 of the liquid fuel in the tank 23. The cylindrical body 11 has slidably mounted therein a hollow valve member 30 which is formed with a peripheral groove 31 intermediate the ends thereof. In one position of the valve member 30 the groove 31 is adapted to be in registry with the intake and outlet ports 17 and 24 respectively, so as to permit the free passage of carbon dioxide gas from the intake port 17 to the outlet port 24. The valve member 30 is provided at one end thereof with a threaded plug or head 32, which is formed with a peripheral groove 33 in which an annular sealing ring 34 of fibrous material or the like is adapted to engage. The opposite end of the valve member 30 has threadedly secured thereto a second head 35, which is formed with a peripheral groove 36 in which a sealing member 37 is adapted to engage.

The body or housing 11 has formed therein a pair of vents 38 and 39 disposed on opposite sides of the intake port 17. The vents 38 and 39 are adapted to permit the exhaust of carbon dioxide gas from the cylinder 18 which leaks past the peripheral surface of the valve member 30. The valve member 30 at a point adjacent the head or plug 32 is provided with an annular groove or channel 40, which is adapted to be normally in communication with the vent 38 in substantially any position of the valve member 30. The opposite end of the valve member 30 is provided with a second annular groove 41, which is sufficiently long so that the groove 41 may be maintained in constant registry with the vent 39 in substantially any position of the valve member 30.

A valve plug operating structure is disposed at one end of the housing or body 11 and includes a diaphragm housing formed of an inner annular housing member 42, which is formed integral with the housing member 11 and is of substantially a greater diameter than the diameter of the housing 11. The housing member 42 has an annular flange 43 at its outer end which is adapted to confront an annular flange member 44 which is carried by a cap or outer diaphragm housing member 45. A flexible diaphragm 46 is interposed between the two flanges 43 and 44 and fastening devices 47 engage through the flanges 43 and 44 and tightly hold the outer edge portions of the diaphragm 46.

A valve plug operating rod 48 is slidable through a guide bushing 49 including a gland 50 and one end of the rod 48 is threadably connected, as at 51, with the head 35. The opposite or outer end of the rod 48 extends into the center of the diaphragm 46 and is fixed relative to the diaphragm 46 by inner and outer lock nuts 52 and 53. An annular plate 54 is interposed between the inner lock nut 52 and the inner face of the diaphragm 46 and an outer annular plate 55 is interposed between the outer lock nut 53 and the outer face of the diaphragm 46.

A rod limiting screw 56 is threaded through the head 57 of the housing member 45 being provided with a knob 58 at its outer end, and the screw 56 is disposed in axial alignment with the rod 48 so as to thereby limit the outward movement of the rod 48 and the outward flexing of the diaphragm 46. The cylindrical side wall 59 of the diaphragm housing member 42 is provided with opposed air vents 60, so as to permit the intake or exhaust of air in and from the inner housing member 42. The cylindrical body 11 at the end thereof opposite from the rod 48 has mounted therein an expanding spring 61 which at its inner end bears against the outer end of the head 32. A cap shaped spring compressing member 62 is slidable in the cylinder 18 and bears against the outer end of the spring 61. A spring tensioning screw 63 is threaded through a head or plate 64 secured to the adjacent end of the cylinder body 11 by fastening devices 65. The spring 61 is adapted when pressure conditions are normal in the carbon dioxide system to maintain the groove 31 of the valve body 30 in registry with the two ports 17 and 24, so that the gas from the tank 15 may freely flow into the space 28 in the fuel tank 23.

In order to provide a means whereby the carbon dioxide gas pressure in the space 28 of the tank 23 may be utilized for moving the valve member 30 to a closed position with the groove 31 out of registry with the two ports 17 and 24, I have provided a flexible tubular member 66 which is connected at one end to a coupling member 67 carried by a plate 68. The plate 68 is fixed by fastening devices 69 to the bottom wall 22 of the tank 23 and the opposite or free end of the flexible member 66 extends through a buoyant body 70, which is mounted within the tank 23. The body 70 may be in the form of a float such as a hollow rubber ball or the like and the flexible member 66 extends diametrically through the float 70 and has secured to its extended end 71 a cap 72 which is carried by a spider or radial arms 73. The cap 72 is provided so that a minimum of liquid fuel can splash or otherwise enter the flexible member 66.

A short length of pipe 74 extends from the plate 68 and is connected to the coupling member 67. The pipe 74 is connected at its lower end to a trap member 75. The trap member 75 has mounted therein a pipe 78 having a cap 79 similar to the cap 72. The pipe 78 is sustantially smaller in diameter than the diameter of the trap 77 so that the gas entering the trap 77 may pass outwardly through the pipe 78 and beneath the cap 79. Any liquid fuel which enters the pipe or hose 66 is adapted to be contained in the trap 77 about the pipe 78 and below the cap 79.

The trap 77 is connected at its lower or outlet end to a T-shaped coupling member 80. The coupling member 80 is connected at its lower side, as at 81, to a coupling member 82 which is threaded into the boss 21 spaced from the coupling member 20. The valve body 11 is provided with a port 83 communicating with the T 80 through the coupling member 82, and the body 11 is also provided at a point diametrically opposite the port 83 with an exhaust or vent port 84. The valve plug 30 is provided with an annular groove 85 which in one position of the valve plug 30 is adapted to be disposed in registry with the two ports 83 and 84, so that the gas from the space 28 in the tank 23 may be freely exhausted into the atmosphere. A pipe 86 is connected at one end to the T 80 and at the opposite end is connected to a coupling member 87. The coupling member 87 communicates with a port 88, which is formed in the head 57 so that when the exhaust groove 85 is out of registry with the two ports 83 and 84, the carbon dioxide pressure in the space 28 will be communicated with the outer side of the diaphragm 46, the gas entering the pressure chamber 89 formed by the outer diaphragm housing member 45.

In normal operation the cylinder 18 has oil or other liquid disposed at the opposite ends of the plugs 32 and 35, so that the valve plug 30 will be under constant lubrication. The valve body 11 is provided with a pair of by-pass ports 90 and 91 at each end of the valve member 30, and a by-pass pipe 92 is connected at the opposite ends thereof by coupling members 93 and 94 with the ports 90 and 91 respectively. A plate 95 is secured by fastening devices 96 to the inner end of the housing member 42 so as to cut off communication between the cylinder 18 and the interior of the housing member 42. In practice the valve operating rod guide 49 is carried by the plate or head 95.

Referring now to Figure 3, there is disclosed a pressure operated valve structure which is adapted to be connected in the system shown in Figure 1 as a substitute for the valve structure 10 including the diaphragm structure shown in Figure 1. The carbon dioxide tank 15 is adapted to be connected with a pipe 14a which is connected with a valve housing 97. The housing 97 is provided with a boss 98 at one side thereof and intermediate the ends thereof and is also provided with a diametrically opposed boss 99 with which a pipe 19a is adapted to be connected. The pipe 19a is connected at the opposite end thereof with the fuel tank shown in Figure 1.

A cylindrical valve plug 100 is slidable in a cylinder 101 formed in the housing 97 and the plug 100 is formed intermediate the ends thereof with an annular groove 102, which in the normal operating position of the valve structure is adapted to be disposed in registry with diametrically opposed intake and outlet ports 103 and 104 carried by the housing 97 and which communicate with the bosses 98 and 99 respectively. The valve member 100 is provided adjacent the opposite ends thereof with a pair of elongated annular grooves 105 and 106, which are adapted to be in constant registry with vents 107 and 108 formed in the housing 97 on opposite sides of the bosses 98 and 99. The vents 107 and 108 are so positioned that in any position of the valve plug 100 these vents will be in communication with the respective annular channels or grooves 105 and 106 in order to permit any gas leaking about the periphery of the valve plug 100 being exhausted into the atmosphere.

The valve body 97 at its outer end has threadably mounted therein a plug 109 through which a plug limiting shaft 110 is threaded. The shaft 110 has a knob 111 fixed on its outer end by means of which the shaft 110 may be adjusted relative to the plug 109. The inner end of the shaft 110 has mounted therein a plate 112 which is adapted to abut againust the outer end of the valve plug 100 and hold the plug 100 with the groove 102 in registry with the two ports 103 and 104.

A diaphragm housing, generally designated as 113, is secured to a flange 114 carried by the valve housing 97 by fastening devices 115. The diaphragm housing 113 includes a pair of complementary housing members 116 and 117, which are formed with confronting flanges 118 and 119 secured together by fastening devices 120. The housing member 116 has an intake port 121 and a pressure pipe line 86a is connected with the port 121 and is also adapted to be connected with the trap structure shown in Figure 1. A flexible diaphragm 122 is interposed between the two housing members 116 and 117 and engages between the flanges 118 and 119.

A valve operating rod 123 is secured at one end as by a pin 124 to the other end of the valve plug 100. The rod 123 is slidable through a guide 125 which is carried axially by the housing member 116. The rod 123 extends through the diaphragm 122 and is fixed against movement relative to the diaphragm 122 by means of a pair of clamping members or plates 126 and 127, which are fixed to set screws 128 and 129 to the rod 123. The plates or clamping members 126 and 127 are secured together on opposite sides of the diaphragm 123 by fastening devices 130.

A second valve housing 131 is disposed in axial alignment with the housing 97 on the opposite sides of the diaphragm housing 113 and includes a cylindrical body 132 having a flange 133 at its inner end which is fixed by fastening devices 134 to the outer wall 135 of the housing member 117. A tubular or cylindrical valve member 136 is slidable in the cylinder 132 and is fixed by means of a pin 137 to the opposite end of the rod 123. The rod 123 slidably extends through a guide member 138 which is mounted axially of the end wall 135. The cylindrical valve plug 136 has formed in the peripheral surface thereof an annular groove 139, which is adapted to be normally disposed out of registry with a pair of opposed ports 140 and 141, which are carried by the cylindrical member 132. The port 140 is adapted to be connected by means of a pipe 81a to the trap structure shown in Figure 1, and an exhaust pipe 142 is connected with the housing member 132 communicating at one end with the exhaust port 141 and at the other end communicating with the atmosphere.

A spring 143 is disposed in the housing 132 and bears at its inner end against the outer end of the valve member 136. A spring tensioning plate 144 is slidable in the cylindrical body 132 and bears against the outer end of the spring 143. A spring tensioning bolt or shaft 145 is threaded through a bushing 146 carried by the outer end wall 147 of the valve housing 132. The housing 132 has an opening or port 148 outwardly of the valve member 36 and one end of the by-pass pipe 149 is adapted to be connected with the port 148. The opposite end of the pipe 149 is adapted to be connected with a boss 150 and communicates with a port 151 formed in the boss 150 which likewise communicates with the cylinder 101 outwardly of the valve plug 100. The pipe 149 is adapted to be filled with a liquid and in like manner the cylinder 132 is filled with a liquid. The cylinder 101 outwardly from the valve member 100 is filled with a liquid and this liquid is prevented from passing through the interior of the valve plug 100 by means of the plug limiting plate 112, which normally closes the outer end of the plug 100. In practice, it is immaterial whether the entire area of the cylinder 101 be filled with liquid as this liquid cannot exhaust from the cylinder 101 except through the port 151.

The diaphragm housing member 117 on the outer side of the diaphragm 122 is provided with a pair of vents 152 and 153, so that air may freely enter and be discharged from the housing member 117.

In order to provide a means whereby the oil in the by-pass pipe 147 and in the opposite ends of the valve housings 97 and 131 may be maintained in the desired fluid condition, I have provided an electrical heater element 154 which is disposed about a portion of the pipe 149 and is adapted to be connected by wires 155 to a suitable source of electric current supply. In this manner when the aeroplane is in cold atmosphere which might tend to prevent the free flowing of the oil in the pipe 149 and in the two valve housings 97 and 131 the oil may be heated by the heating member 154. In this manner the valve plugs 100 and 136 will be permitted to freely slide in their respective valve housings under all weather conditions.

In Figures 4 and 5 there is disclosed another modification of the valve structure incorporated in the system shown in Figure 1. A valve housing generally designated, as at 156, is provided with a tapered or substantially conical valve plug seat 157. The housing 156 is formed with an intake port 158 with which a pipe 14b is adapted to be connected. The pipe 14b is adapted to be connected at its opposite end to the carbon dioxide supply tank shown in Figure 1. The valve housing 156 is also provided with an outlet port 159 having a pipe 19b connected therewith. The pipe 19b is adapted to be connected with the fuel tank as shown in Figure 1, so that the carbon dioxide gas may flow from the pipe 14b through the valve structure 156 to the pipe 19b and the fuel tank. A substantially conical valve plug 160 is rotatable in the valve seat 157 and is provided with a passage 161 therethrough, which in the normal position of the plug 160 is adapted to communicate the intake port 158 with the outlet port 159. The housing 156 is formed with a pair of vents 162 and 163 on opposite sides of the port 159, which communicate with annular grooves 164 and 165 respectively carried by the plug 160. The vents 162 and 163 are adapted to permit the escape of any carbon dioxide gas which leaks about the plug 160.

A spring 166 is disposed in an oil chamber 167 formed in the housing 156 outwardly of the plug 160 and at its inner end bears against an annular washer 168, which engages against the outer end of the plug 160. The housing 156 is provided with an annular flange 169 at its outer end and a plate or head 170 is secured by fastening devices 171 to the flange 169. An electric heating element 172 is threaded through the head or plate 170 and is adapted to be connected by means of wires or conductors 173 to a suitable source of electric current supply.

The opposite or small end of the plug 160 has secured thereto or formed integral therewith a reduced diameter stem 174 which rotatably engages through a bushing 175. The bushing 175 is threaded into an opening 176 formed in the adjacent end of the housing 156. A substantially L-shaped plug operating lever 177 has one arm thereof fixed as by a nut 178 to the stem 175. The other arm of the bell crank 177 is provided intermediate the ends thereof with a pin 179, the purpose of which will be hereinafter described. The outer end portion of the bell crank 177 is provided with a right angularly disposed or twisted portion 181 which at its under side is adapted to bear against an adjustable limiting or stop member 182. The stop member 182 is threaded through a plate 183 carried by a vertically disposed member 184. A base plate 185 extends right angularly from the lower end of the vertical plate 184 and is fixed as by fastening devices 186 to the top wall 187 of an upper diaphragm housing member 188. A spring 189 is interposed between an upper horizontal arm 190 extending from the vertical plate 184 and the lower end of the spring 189 is adapted to bear against the bell crank extension 181. A cup-shaped washer 191 engages the upper end of the spring 189 and a spring tensioning member 192 is threaded through the arm 190 and engages in the cup-shaped member 191.

The valve housing member 156 is provided with a plurality of ears 190 which are adapted to be secured by fastening devices 193 to the top wall 187 of the upper diaphragm housing member 188. The valve housing 156 is disposed in a position whereby the long horizontal arm of the bell crank 177 will extend substantially diametrically of the diaphragm housing member 188.

A lower diaphragm housing member 194, which is formed with a lower wall 195 and a cylindrical side wall 196 having a flange 197, is secured by fastening devices 198 to a flange 199 carried by the upper housing member 188. A flexible diaphragm 200 is interposed between the two housing members 188 and 194 and engages at its marginal portions between the flanges 197 and 199. The center of the diaphragm 200 has secured thereto a valve plug operating rod 201 which extends through a guide member 202 carried by the top wall 187. The outer end of the rod 200 has secured thereto a plate or head 203 having an elongated slot 204 through which the pin 179 slidably engages. The top wall 187 of the diaphragm housing member 188 is provided with an air vent 205 and the bottom wall 195 of the lower housing member 194 has connected therewith a pressure pipe 86b, which is adapted to be connected with the trap structure shown in Figure 1.

A T-shaped coupling member 80b is adapted to have one side thereof connected with the pipe 86b and another side of the T coupling 80b is adapted to be connected to the trap structure shown in Figure 1. The third side of the coupling 80b is adapted to be connected by means of a pipe 206 to a boss 207 carried by the valve housing 156. The boss 207 has a port 208 extending therethrough which communicates with the interior of the housing 156. The plug 160 is formed with an opening 209 which in one position of the plug 156 is adapted to communicate with the port 210 which is diametrically opposite from the port 208. A pipe 211 is connected with the port 210 and is adapted to exhaust the carbon dioxide gas passing from the pipe 206 through the ports 208 and 210 to the atmosphere.

In the use and operation of this fuel tank neutralizing means, the valve structure 10 is adapted to be connected at one side by means of the pipe 19 to the tank 23. The opposite side of the valve member 10 is connected by the pipe 14 to the source of carbon dioxide supply 15. The tank 23 may be initially filled with the liquid fuel and during the filling of the tank 23 the valve 16 is moved to a completely closed position. After the tank 23 has been filled the valve member 16 may be moved to the desired open or partly open position to permit the flow of carbon dioxide gas from the tank 15 through the valve structure 10 to the tank 23. Initially the valve plug 23 will be in the position shown in Figure 1 with the annular groove 31 in registry with the two ports 17 and 24. This initial position of the plug 30 is obtained by adjustment of the threaded shaft 56. As the liquid fuel is drained from the tank 23, the carbon dioxide gas will bubble up through the liquid fuel and enter the space 28 above the top or level of the fuel.

The gas in the space 28 will also flow through the flexible member 56, the trap 77 and the pipe 86 to the pressure chamber 89 on the outer side of the diaphragm 46. The tension of the spring 61 at the outer end of the plug 30 may be adjusted to maintain a balance with respect to the plug 30 in order to normally hold the plug 30 in the position whereby communication between the two ports 17 and 24 is maintained. In the event there is an over-balance of the pressure on the outer side of the diaphragm 46 the diaphragm 46 will flex inwardly and move the plug 30, so that the groove 31 will be out of registry with the two ports 17 and 24. The movement of the plug 30 under the action of the diaphragm 46 will be sufficient to bring the groove 85 into registry with the pressure relief ports 83 and 84, so as to permit the escape of a small quantity of the carbon dioxide gas until the previous balance has been obtained whereupon the spring 61 will return the plug 30 to the position wherein the groove 31 is in registry with the ports 17 and 24.

In the adjustment of the spring 61, this spring is adjusted to maintain the valve plug 30 open at ground level atmospheric pressure. As the atmospheric pressure acts on one face of the diaphragm 46 through the openings 60 a balance will be obtained on both sides of the diaphragm to thereby provide the desired gas pressure in the tank 23. When the air pressure on the diaphragm reduces by reason of the lighter air in higher altitudes, the gas pressure in the chamber will overbalance the air pressure and thus move the valve 30 to a closed position with respect to ports 17 and 24, but at the same time the excess pressure in tank 23 will be reduced by exhausting the gas from tank 23 through ports 83 and 84. When the higher altitude air pressure in housing 42 is counterbalanced by the pressure in chamber 89, the spring 61 will again move the valve 30 to an open position relative to ports 17 and 24. This balancing of pressure will prevent exploding or splitting of the tank 23 due to excess interior pressure.

In the event the tank 23 should be punctured so as to thereby reduce the pressure in the space 28 beyond a predetermined degree, the pressure from the tank 15 will be exhausted through the openings formed in the wall or walls of the tank 23. Where this contingency arises the operator of the aeroplane may move the valve member 16 to a closed position so as to prevent the complete exhaustion of the gas from the tank 15. The tank 15 is adapted to contain sufficient carbon dioxide gas under pressure which will completely fill the tank 23 when the tank 23 has been entirely emptied. The structures shown in Figures 3, 4 and 5 as modifications of this invention will operate in a manner similar to that shown in Figure 1.

What I claim is:

1. In a fuel tank neutralizing device of the type having a fuel tank, an inert gas container, means for conveying the inert gas from said container to said tank and means for exhausting inflammable gases from said tank; a valve construction for controlling inert gas and inflammable gas flow including a valve body comprising a hollow cylinder closed at each end, said body having a spaced apart pair of balance ports, one of said ports being adjacent each end of said body, a spaced apart pair of vent ports intermediate of said balance ports, an opposed pair of inert gas ports intermediate of said vent ports and an opposed pair of inflammable gas ports intermediate said vent ports and spaced apart from said inert gas ports, a valve plug slidably arranged in said body, said plug being substantially shorter than said body and forming balance chambers at each end of said body, said valve plug having a substantially wide circumferential groove adjacent each end thereof and adapted to remain in registry with said vent ports constantly, said plug also having a substantially narrow circumferential inert gas groove adapted to register with said inert gas ports in one position of said plug and a substantially narrow circumferential inflammable gas groove adapted to register with said inflammable gas ports in another position of said plug, a conduit connecting said balance chambers together through said balance ports, means normally urging said plug in one direction effecting registry of said inert gas groove with said inert gas ports, and pressure responsive means operable to move said plug in the opposite direction effecting registry of said inflammable gas groove with said inflammable gas ports.

2. In a fuel tank neutralizing device of the type having a fuel tank, an inert gas container, means for conveying the inert gas from said container to said tank and means for exhausting inflammable gases from said tank; a valve construction for controlling inert gas and inflammable gas flow including a valve body comprising a hollow cylinder closed at each end, an enlarged bell-like housing formed integrally with one end of said body, a cap member secured to the end of said housing, said body having a spaced apart pair of balance ports, one of said ports being adjacent each end of said body, a spaced apart pair of vent ports intermediate of said balance ports, an opposed pair of inert gas ports intermediate said vent ports and spaced apart from said inert gas ports, a valve plug slidably arranged in said body, said plug being substantially shorter than said body and forming balance chambers at each end of said body, said valve plug having a substantially wide circumferential groove adjacent each end thereof and adapted to remain in registry with said vent ports constantly, said plug also having a substantially narrow circumferential inert gas groove adapted to register with said inert gas ports in one position of said plug and a substantially narrow circumferential inflammable gas groove adapted to register with said inflammable gas ports in another position of said plug, a conduit connecting said balance chambers together through said balance ports, means normally urging said plug in one direction effecting registry of said inert gas groove with said inert gas ports, and a pressure responsive diaphragm secured in said bell-like housing, said diaphragm being connected to said valve plug whereby movement of said diaphragm will move said plug in the opposite direction effecting registry of said inflammable gas groove with said inflammable gas ports.

3. In a fuel tank neutralizing device of the type having a fuel tank, an inert gas container, means for conveying the inert gas from said container to said tank and means for exhausting inflammable gases from said tank; a valve construction for controlling inert gas and inflammable gas flow including a valve body comprising a hollow cylinder closed at each end, said cylinder having a straight bore for a portion of its length adjacent one end of said cylinder, a substantially small straight bore for a portion of its length adjacent the other end thereof and a tapering bore connecting said first-named bores, said body having a pair of opposed inert gas ports communicating with said tapered bore, a pair of vent ports communicating with said tapered bore one on each side of one of said inert gas ports and a pair of opposed inflammable gas ports communicating with said tapered bore, a tapered valve plug rotatably arranged in said tapered bore of said valve body, said plug having a pair of annular grooves arranged to constantly communicate with said vent ports, a transverse inert gas bore arranged to alternately connect said inert gas ports and a transverse inflammable gas bore arranged to alternately connect said inflammable gas ports, means constantly urging said tapered plug into said tapered bore, and pressure responsive means for rotating said tapered plug in said valve body alternately connecting and disconnecting said inert gas ports and said inflammable gas ports.

4. In a fuel tank neutralizing device of the type having a fuel tank, an inert gas container, means for conveying the inert gas from said container to said tank and means for exhausting inflammable gases from said tank; a valve construction for controlling inert gas and inflammable gas flow including an inert gas valve body comprising a hollow cylinder closed at one end, a diaphragm housing secured to the opposite end of said body, an inflammable gas valve body comprising a hollow cylinder closed at one end and having its opposite end secured to said diaphragm housing oppositely of said inert gas valve body, said inert gas valve body having a balance port adjacent one end thereof, a pair of opposed inert gas ports and a spaced apart pair of vent ports with one of said vent ports positioned on each side of one of said inert gas ports, an inert gas valve plug slidably arranged in said inert gas valve body, said plug being substantially shorter than said body and forming a balance chamber at the closed end thereof, said valve plug having a substantially wide annular vent groove adjacent each end thereof and adapted to continuously communicate with said vent ports and a substantially narrow annular inert gas groove positioned between said vent grooves and adapted to alternately align with said inert gas ports, said inflammable gas valve body having a balance port adjacent the closed end thereof and a pair of opposed inflammable gas ports centrally thereof, an inflammable gas valve plug slidably arranged in said inflammable gas valve body, said valve plug being substantially shorter than said valve body and forming a balance chamber at the closed end of said body, said inflammable gas valve plug having an annular groove adapted to alternately connect said inflammable gas ports, a diaphragm secured centrally of said diaphragm housing, means connecting said valve plugs to said diaphragm, conduit means connecting said balance ports, means normally urging said valve plugs in one direction aligning said inert gas groove with said inert gas ports, and means alternately urging said diaphragm and valve plugs in the opposite direction aligning said inflammable gas groove with said inflammable gas ports.

5. In combination, a liquid fuel tank, an inert gas pressure tank, a pipe connecting said tanks together, a valve interposed in said pipe for controlling the passage of inert gas to said fuel tank and for controlling the passage of inert and combustible gases from said fuel tank, and valve operating means connected with said fuel tank and said valve for regulating the opening and closing of said valve in accordance with atmospheric pressure and the pressure in said fuel tank, said valve operating means including a diaphragm housing, a diaphragm in said housing, means connecting said diaphragm to said valve to open or close the latter by flexing of said diaphragm, said housing being open at the atmosphere at one side of said diaphragm whereby atmospheric pressure will act to flex said diaphragm in one direction, and a pipe connected at one end with said fuel tank and at the other end with said housing on the opposite side of said diaphragm whereby fluid pressure in said tank will act to flex said diaphragm in the opposite direction.

6. In combination, a liquid fuel tank, an inert gas pressure tank, a pipe connecting said tanks together, a valve interposed in said pipe for controlling the passage of inert gas to said fuel tank and for controlling the passage of inert and combustible gases from said fuel tank, and a combined gas and atmospheric pressure operator connected with said valve for controlling the opening and closing of said valve, said valve operator means including a diaphragm housing, a diaphragm in said housing, means connecting said diaphragm to said valve to open or close the latter by flexing of said diaphragm, said housing being open to the atmosphere at one side of said diaphragm, whereby atmospheric pressure will act to flex said diaphragm in one direction, and a pipe connected at one end with said fuel tank and at the other end with said housing on the opposite side of said diaphragm whereby fluid pressure in said tank will act to flex said diaphragm in the opposite direction.

7. In combination, a liquid fuel tank, an inert gas pressure tank, a pipe connecting said tanks together, a valve interposed in said pipe for controlling the passage of inert gas to said fuel tank and for controlling the passage of inert and combustible gases from said fuel tank, a combined gas and atmospheric pressure operator connected with said valve for regulating the opening and closing of said valve, and a reducing valve also interposed in said pipe between said first valve and said pressure tank, said valve operator means including a diaphragm housing, a diaphragm in said housing, means connecting said diaphragm to said valve to open or close the latter by flexing of said diaphragm, said housing being open to the atmosphere at one side of said diaphragm whereby atmospheric pressure will act to flex said diaphragm in one direction, and a pipe connected at one end with said fuel tank and at the other end with said housing on the opposite side of said diaphragm whereby fluid pressure in said tank will act to flex said diaphragm in the opposite direction.

GEORGE B. DAVIS, Jr.